M. B. McLAUTHLIN AND A. K. TYLEE.
SELECTOR FOR AUTOMATIC HOISTING APPARATUS.
APPLICATION FILED AUG. 28, 1915.
1,341,143.
Patented May 25, 1920.
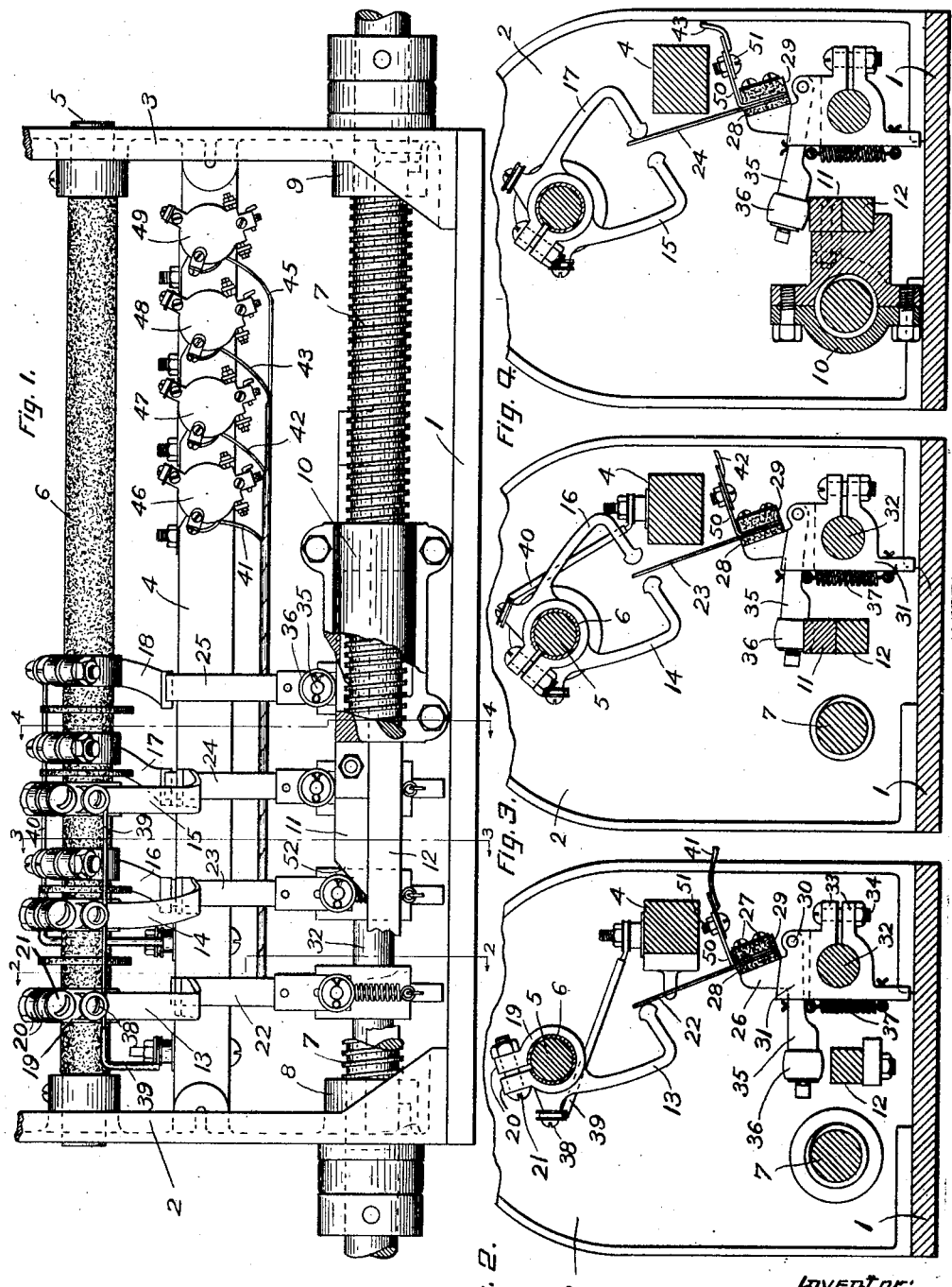

UNITED STATES PATENT OFFICE.

MARTIN B. McLAUTHLIN, OF MALDEN, MASSACHUSETTS, AND ARTHUR K. TYLEE, OF MONTREAL, QUEBEC, CANADA.

SELECTOR FOR AUTOMATIC HOISTING APPARATUS.

1,341,143.  Specification of Letters Patent.  Patented May 25, 1920.

Application filed August 28, 1915. Serial No. 47,809.

*To all whom it may concern:*

Be it known that we, MARTIN B. McLAUTHLIN and ARTHUR K. TYLEE, respectively a citizen of the United States, residing at Malden, in the county of Middlesex and State of Massachusetts, and a subject of the King of Great Britain, residing at Montreal, Province of Quebec, Canada, have invented certain new and useful Improvements in Selectors for Automatic Hoisting Apparatus, of which the following is a specification.

The present invention relates to a selector for electrical hoisting apparatus, such for example, as electric elevators and dumb waiters, for determining the level or location at which the car or other apparatus which is moved by the electric current shall be automatically stopped after having been set in motion. The apparatus herein illustrated and described is the same in principle, and in its general features of construction and operation, as the selector shown and described in our patent for electric driving apparatus dated January 5, 1916, numbered 1,169,174, and it includes also certain improvements over the selector shown in the said patent. In those respects in which the invention described in this application is the same as the invention contained in the selector shown in the aforesaid patent, the present application is a continuation of the said patent.

The object of the invention is to provide a simple and efficient apparatus controlled by the travel of the elevator car or other moving object which is propelled by the hoisting apparatus, to operate a series of switches in succession in order to complete and break circuits containing other switches, which may be operated manually for the purpose of causing the load to be raised or lowered, according to the position of the selector, and to stop automatically at a predetermined point. The manner in which the foregoing and other objects are accomplished by our present invention is explained in the following description, to which reference is directed in connection with the accompanying drawings forming a part of this specification. In the said drawings, Figure 1 is an elevation of a selecting mechanism embodying our invention in one of the possible forms which the same may possess, parts being shown broken away for additional clearness.

Figs. 2, 3, and 4 are cross sections taken on lines 2—2, 3—3, and 4—4, respectively, of Fig. 1, looking in the direction of the arrows on said lines.

The same reference characters indicate the same parts in all the figures.

Referring to the drawings, 1 represents a base and 2 and 3 represent uprights which are mounted on the base 1 and form parts of a frame. These uprights support and are connected to a bar 4 and a rod 5, the latter being provided with a sleeve or covering 6 of insulating material. A screw shaft 7 is rotatably mounted in bearings 8 and 9 in the end pieces 2 and 3, respectively, and is rotated whenever the hoisting mechanism is in operation, at a rate proportional to the rate of travel of the load, by means such as shown in our prior patent referred to, or by any other suitable means. The screw shaft 7 supports a traveler 10 which has elements engaging the threads of the screw shaft and is essentially a nut complemental to the shaft, whereby it is propelled at a rate corresponding to the speed of rotation of the shaft and to the pitch of the screw thread thereon.

For the purposes of this description we have called the member 10 a traveler. While the embodiment of said traveler here shown is constructed as a nut, it may be otherwise constructed within the scope of this invention. Secured to the traveler 10 is a slide 11 which is in effect a part of the traveler. Said slide rests and travels on a bar 12 which forms a support for the slide and extends beside the screw shaft 7 approximately parallel therewith, being supported by the end members 2 and 3. The purpose and function of the slide 11 will be later explained.

Secured upon the rod 5 are switch contact members 13, 14, 15, 16, 17, and 18. Each of these contact members is provided with or connected to a strap or divided collar 19, surrounding the insulating sleeve or covering 6 on the rod 5, and provided with lugs 20 and clamping screws 21 by which they may be securely clamped to the rod in a manner permitting adjustment about the rod and also longitudinally thereof. Coöperating with said contact members are switch members 22, 23, 24, and 25 which are preferably duplicates of one another and all of which are mounted and operated in the same way. Each of said switch members is secured to a holder 26, being clamped on said holder by screws 27 or equivalent clamping means between pieces 28, 29 of insulating material. Each holder 26 is pivoted by means of a pivot pin 30 to a base 31, which base is secured upon a bar 32 in an adjustable manner. Said bar is preferably cylindrical and extends between the end members 2 and 3 of the frame beside the bar 12. Each of the base members 31 is constructed as a block having a passage to receive the bar 32 and having a slot extending from such passage between lugs 33. A screw 34 passes through said lugs and is employed to draw the latter together and clamp the base block upon the bar 32. Thus the block can be adjusted both longitudinally of the bar 32 and also angularly about the same. The base blocks 31 for the various switch members are all alike, and the foregoing description of one of them suffices for all.

Each switch carrier 26 is provided with an arm 35 extending over the guide bar 12 and provided with an antifriction roll 36 which lies over said bar. A spring 37 is connected to the arm 35 and to the base 31 and tends to swing the arm 35 toward bar 12 and the switch member 22 forwardly. In this specification the word "forwardly," and other words of similar import have the meaning of "toward the observer" with respect to Fig. 1, and from right to left with respect to Figs. 2, 3, and 4. The switch members 22, 23, 24 and 25 have the form, in the present embodiment of our invention, of straight bars or tongues each in the same plane, perpendicular to its pivot, with the contact members with which it is respectively associated. Thus the switch member 22 is movable in a plane which contains a part of the contact 13; the switch member 23 is movable in the same plane with and is located between the contact pieces 14 and 16, the switch member 24 is similarly arranged with respect to the contact pieces 15 and 17; and the switch member 25 is arranged in front of the contact piece 18 and is movable into and out of contact with the latter. The contact pieces 13, 14, and 15 are all in front of the switch members 22, 23, and 24 with which they coöperate, and the contact pieces 16, 17, and 18 are all in rear of their respectively complemental switch members 23, 24, and 25.

Each of the contact pieces 13, 14, and 15 is provided with a binding post 38 and all of said contact pieces are connected by their respective binding posts with the same conductor 39, or are otherwise coupled in parallel to the same electric circuit. Similarly the contact pieces 16, 17, and 18 are provided with binding posts which are connected to a conductor 40, or they may all be otherwise connected to a second electrical circuit. One of these conductors or circuits is connected with a solenoid magnet or other apparatus which controls the hoisting of the load, and the other conductor or circuit is connected in a similar manner with a similar device which controls the lowering of the load. The switch members 22, 23, 24, and 25 are connected with individual conductors 41, 42, 43, and 45, respectively, which lead to electromagnets 46, 47, 48, and 49, respectively. The several conductors are connected with their respective switches by straps 50 to which they are clamped by screws 51, and such straps are held in contact with their respective switch members between the insulating bodies 28 and 29, as shown in Figs. 2, 3, and 4. Thus the switch members and complemental contacts, and their circuit conductors form a selective switch mechanism, or a selector, capable of use in the motor controlling system shown in our hereinbefore named patent, which mechanism or selector is essentially the same as that illustrated in Figs. 9 and 10 of our said patent. For an explanation of the electrical connections and circuits with which the herein described selector may be used, reference is directed to the aforesaid patent.

The slide 11 is adapted to pass between the supporting guide bar 12 and the rolls 36 which are connected with the several switch members, and it is provided with a cam shaped or wedge shaped end 52 to facilitate ready entrance between said bar and the said rolls. When the traveler 10 and slide 11 are in their extreme right hand position, with reference to Fig. 1, all of the switch members are left free to be swung into their extreme forward positions by their springs 37, whereby the switch members 22, 23, and 24 are brought into contact with the contact pieces 13, 14, and 15, respectively, and the switch members 23, 24, and 25 are separated from the contact pieces 16, 17, and 18, respectively. It may be assumed for the purposes of this explanation that when the traveler is at the extreme right hand position, the elevator or other carrier or load which is controlled by the selector is at the highest point of its travel, although the reverse may be the case in practice. The circuits including the switch members also include push buttons or other switches corresponding to the several floors, positions, or stages at which the elevator or other load carrier is designed to stop. When the elevator, etc., moves from its extreme position, it causes the shaft 7 to rotate in the direction necessary to shift the traveler toward the left from the right hand position in which we have assumed for the purposes of explanation that it was located.

The first effect produced by the slide 11 is to lift the roll carrying arm of switch 25 and move said switch into engagement with the contact piece 18, thereby closing one of the breaks in the circuit which includes the contact piece 18 and the controller which governs the raising of the load (it being assumed that the elevator in the herein described operation is descending.) The next effect of the slide is to pass under the lifting arm of switch 24, removing said switch from contact member 15, and breaking the circuit of which said contact member is a part. If this is the one which has been previously closed to stop the car, the car stops at this point, but if not, it continues and the further advance of the slide 11 causes its wedge shaped end to move the switch farther and into contact with the contact piece 17, completing the raising circuit for the second stage of the elevator. And so the operation continues until the slide 11 shifts the last switch in the series out of contact with the contact piece 13, and the elevator stops at the opposite end of its path of travel.

In the drawings forming a part of this application we have shown a selector having four switches, and being thereby adapted for use with an elevator, or the like, having four stopping places, but it is evident that our invention is not limited to any particular number of switches or stopping locations, but that it may be indefinitely extended, and also contracted to two or three switches.

The hereinbefore described mechanism or apparatus is a self-contained device capable of being used with any automatic electric hoisting apparatus and being simple in design, positive in operation, and practically incapable of getting out of order. The switch members are preferably springy so that it is possible to provide for enough movement of the lifting arms thereof to be certain of bringing the switches into contact with the pieces wherewith they are designed to make contact when lifted by the slide 11. The capacity for adjustment of the contact pieces provides for an exact regulation of the stopping point of the elevator, so that after the apparatus has been set up minute adjustments may be made in the locations of the contact pieces to cause stoppage of the elevator exactly at the desired point. The provision for adjustment of the switch members and contact pieces longitudinally of their respective supporting bars also provides for a wide range of rough adjustment of the stopping locations, the angular adjustment of the contact pieces about the support 5 being depended on for the fine adjustment for such locations.

It is to be understood that in the choice of the descriptive terms hereinbefore used, we have not intended to have such terms construed as limiting our invention to the precise construction and arrangement of the parts herein shown and described, or in any other manner than as expressly required by the appended claims. The part 11 which is shown here as a slide, is in function a switch actuator, and may be made in other forms than as a slide without departing from the invention. The screw shaft is a propeller for the switch actuator and is typical of any propelling means which might be used, whether like or unlike that here shown, for the same purpose. And the mode of mounting the switch members so as to permit of their displacement might be variously modified without departing from the spirit of the invention.

What we claim and desire to secure by Letters Patent is:

1. A selector for an electric hoisting apparatus, comprising a plurality of switch members, all arranged to move in the same direction, contacts complemental to said members and on respectively opposite sides thereof, and an actuator arranged and operable to shift said members successively and change the positions thereof in relation to their complemental contact pieces, causing one of said members to make contact with its complemental contact, and another one to be separated from its complemental contact.

2. A selector for an electric hoisting apparatus, comprising a plurality of switch members, a contact piece at one side of one of said switch members, and a contact piece on the opposite side of the other of said switch members, carriers for said switch members extending in parallelism with one another, and an actuator for said switch members arranged to travel in a direction transverse to that in which said switch members are movable into contact successively with the carriers for said switch members.

3. A selective switch mechanism for an electric hoisting apparatus, comprising a plurality of contact members, switch members complemental to said contact members, arms connected with said switch members extending respectively parallel to one another, a switch actuator arranged to travel transversely to said arms and to engage and displace the same successively, said switch actuator being of such length as to be capable of holding all of said arms displaced at the same time, and means for giving a gradual progressive movement to said actuator.

4. A selective switch mechanism, comprising switch members mounted movably side by side and each having an actuating arm, an actuator arranged to travel in a direction transverse to the direction in which said arms project and transverse also to the direction in which said switches and arms are movable, and having a cam portion inclined to and crossing the plane of said arms, whereby the actuator is caused to engage the arms successively and displace them all in the same direction; the part of the actuator back of said cam portion having a continuous supporting surface to hold the arms in their displaced positions.

5. A circuit selector, comprising a plurality of switch members arranged side by side and movable in approximately parallel paths, and having actuating portions all in approximately the same plane, an actuator mounted to travel in a path transverse to the paths of movement of the switches, and located so as to engage said actuating portions and displace said members successively in passing them, and contact pieces complemental to said switch members on different sides of different members, whereby progressive movement of said actuator is enabled to put one switch member in contact with its complemental contact piece, and then displace another member from the contact piece with which it was previously in contact.

6. A selector comprising a plurality of contact members, a plurality of switch members arranged to coöperate respectively with said contact members and each movable into and out of contact with its complemental member, holders to which said switch members are pivoted, and rods on which said holders and contact members are respectively mounted and upon which they are adjustable both lengthwise and angularly.

7. A selector for an electric hoisting apparatus, comprising a plurality of switch members, all arranged to move in the same direction, contacts complemental to said members and on respectively opposite sides of the endmost switch members, and on both sides of an intermediate member, and an actuator arranged and operable to shift said members successively and change the positions thereof in relation to their complemental contact pieces.

In testimony whereof we have affixed our signatures.

MARTIN B. McLAUTHLIN.
ARTHUR K. TYLEE.